United States Patent [19]

Hiramatsu

[11] Patent Number: 4,732,245

[45] Date of Patent: Mar. 22, 1988

[54] CONTROL APPARATUS FOR CLUTCH TORQUE IN HYDRODYNAMIC POWER TRANSMITTING DEVICE

[75] Inventor: Takeo Hiramatsu, Kyoto, Japan

[73] Assignee: Mitsubishi Jidosha Kogyo K.K., Tokyo, Japan

[21] Appl. No.: 872,997

[22] Filed: Jun. 11, 1986

[30] Foreign Application Priority Data

Jun. 11, 1985 [JP] Japan .................. 60-126833

[51] Int. Cl.[4] ............ F16H 45/02; F16D 43/28; B60K 41/02
[52] U.S. Cl. ............ 192/0.032; 192/0.076; 192/3.3; 192/3.31
[58] Field of Search .......... 192/0.076, 0.032, 3.3, 192/3.31, 3.29

[56] References Cited

U.S. PATENT DOCUMENTS

| | | | |
|---|---|---|---|
| 4,428,467 | 1/1984 | Hiramatsu | 192/3.31 |
| 4,431,095 | 2/1984 | Suga | 192/3.31 |
| 4,582,182 | 4/1986 | Takeda et al. | 192/3.31 |
| 4,582,185 | 4/1986 | Grimes | 192/3.3 X |
| 4,640,394 | 2/1987 | Higashi et al. | 192/3.31 X |
| 4,640,395 | 2/1987 | Murasugi et al. | 192/3.31 |

FOREIGN PATENT DOCUMENTS 146950 9/1982 Japan ................ 192/3.29

Primary Examiner—Rodney H. Bonck
Attorney, Agent, or Firm—Sughrue, Mion, Zinn, Macpeak & Seas

[57] ABSTRACT

The torque of a clutch disposed in parallel with a hydrodynamic power transmitting device provided between an engine and a transmission is gradually reduced upon disengaging the clutch when the torque of the engine is higher than a predetermined level. As a result, the instantaneous great drop in the output torque of the transmission at the time of the disengagement of the clutch is prevented to thereby improve the acceleration response of a vehicle.

4 Claims, 8 Drawing Figures

CONTROL APPARATUS FOR CLUTCH TORQUE IN HYDRODYNAMIC POWER TRANSMITTING DEVICE

BACKGROUND OF THE INVENTION

1. Field of the Invention

The present invention relates to an apparatus for controlling power transmission in a hydrodynamic power transmitting device, such as a slip clutch (which is kept in a prescribed state of slip in order to prevent the transmission of the fluctuation in the output torque of an engine while the clutch is engaged) or a lockup clutch (which is of the direct connection type).

2. Background Art

A clutch of either type is usually provided in parallel with a torque converter attached to the automatic transmission of a vehicle in order to enhance fuel efficiency. In such a conventional transmission system, the output torque on an engine is transmitted through the torque converter while the clutch is disengaged. On the other hand, while the clutch is engaged, the output torque of the engine by-passes the torque converter and is transmitted through the clutch.

In the conventional clutch system, when the clutch is disengaged, applied oil pressure is switched by a valve and delivered to a drain port to quickly eliminate the hydraulic engaging force of the piston of the lockup clutch. For this reason, the output torque of the transmission instantaneously drops to near zero when the lockup clutch is disengaged during the acceleration of the engine. Therefore, the transmission and clutch system has a problem that the response of the vehicle to the acceleration is deteriorated.

SUMMARY OF THE INVENTION

An object of the present invention is to solve the above-described problems.

In particular, it is an object of the present invention to provide an apparatus for controlling a clutch in a hydrodynamic power transmitting device, in which the response of the vehicle to the acceleration of an engine is improved by keeping the output torque of a transmission from greatly dropping when the clutch is disengaged while the torque of the engine is above a predetermined positive value during acceleration.

The present invention can be summarized as follows.

A hydrodynamic power transmitting device is interposed between the output shaft of the engine and the input shaft of the transmission. A clutch of the variable engaging force type is disposed in parallel with the hydrodynamic power transmitting device so that the torque of the engine can be transmitted to the input shaft of the transmission through the clutch and by-passing the hydrodynamic power transmitting device. Commanding means, which commands the time when to start disengaging the clutch according to the operating condition of the engine. A controller, which receives and instruction signal from the commanding means gradually decreases the engaging force of the clutch in disengaging the clutch when the torque of the engine is above a predetermined positive value.

In the apparatus provided according to the present invention, the engaging force of the clutch is gradually decreased in disengaging the clutch while the change in the torque of the engine is positive as in the acceleration thereof, so that the transmission of the torque through the clutch is gradually replaced by the transmission of the torque through the hydrodynamic power transmitting device.

BRIEF DESCRIPTION OF THE DRAWINGS

An embodiment of the present invention, an apparatus for controlling a clutch for a hydrodynamic power transmitting device, is now described with reference to the drawings.

DETAILED DESCRIPTION OF THE PREFERRED EMBODIMENTS

Figure 1:
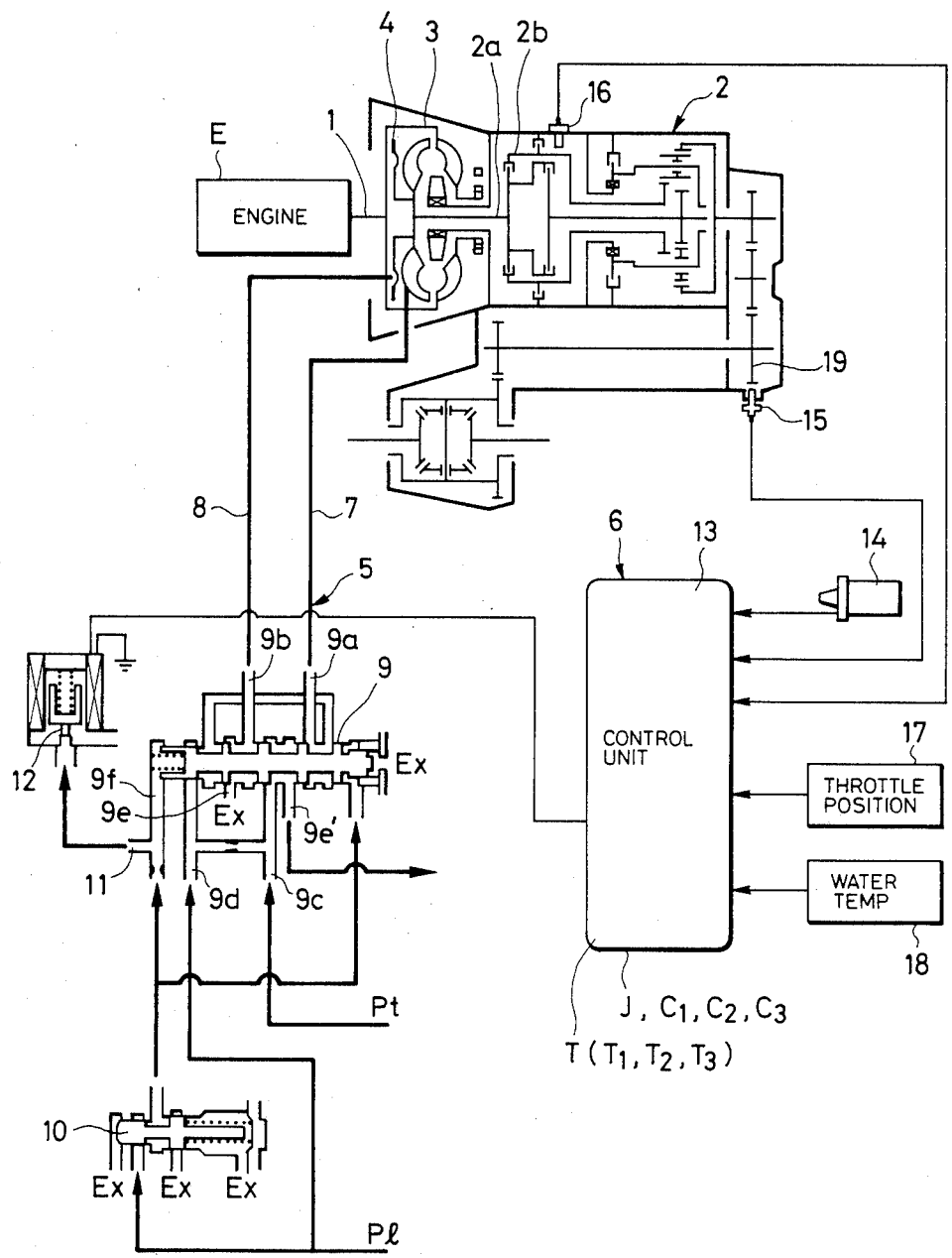
FIG. 1 shows a schematic view of the apparatus.

As shown in FIG. 1, a torque converter (hydrodynamic power transmitting device) 3 is provided between the output shaft 1 of an engine E and the input shaft 2a of an automatic transmission 2. A clutch 4 is provided at the torque converter 3 so that the clutch is functionally disposed in parallel with the torque converter. Torque from the engine E can be transmitted to the input shaft 2a of the automatic transmission 2 through the clutch 4. The engaging force (which corresponds to the torque transmission capacity) of the clutch 4 can be altered.

An oil pressure circuit 5 is connected to the clutch 4 and is used for engaging and disengaging it. A control circuit 6 regulates the oil pressure in the oil pressure circuit 5. A clutch engaging oil passage 7 and a clutch disengaging oil passage 8 are connected to the clutch 4. A clutch control valve 9 is connected to the oil passages 7 and 8 so as to regulate the supplied quantity and pressure of pressure oil to the oil passages.

Ports 9a and 9b of the control valve 9 are connected to the oil passages 7 and 8. Oil pressure Pt from a torque converter control valve (not shown in the drawings) and line oil pressure Pl act on ports 9c and 9d. Ports 9e and 9e' are connected to a reservoir. A control port 9f receives oil pressure through a pressure reduction valve 10. An oil passage 11 leads from the control port 9f of the control valve 9 and is connected to the reservoir.

A solenoid valve 12 is provided in the oil passage 11. The solenoid valve 12 is duty controlled by an electric control signal (pulse train signal) from a control unit 13 so as to control the degree of opening of the oil passage 11. When the oil passage 11 is entirely closed by the solenoid valve 12 (at a duty ratio of 0%), the control valve 9 connects the disengaging oil passage 8 to the port 9c and connects the disengaging oil passage 7 to the reservoir through port 9e'. Thereby, the clutch 4 is disengaged. When the oil passage 11 is entirely opened by the solenoid valve 12 (at a duty ratio of 100%), the control valve 9 connects the engaging oil passage 7 to the port 9d and connects the disengaging oil passage 8 to the reservoir through port 9e. Thereby the clutch 4 is engaged. The ratio of the distribution of the pressurized oil to the oil passages 7 and 8 by the control valve 9 can be altered by changing the duty ratio of the solenoid valve 12, to optionally control the engaging force on the clutch 4. Thereby, the clutch 4 is made to act as a slip clutch. The control valve 9, its operation and other aspects of this invention are described in more detail in U.S. Pat. No. 4,428,467 to Hiramatsu, assigned to the assignee of the present application and incorporated herein by reference.

The control unit 13 sends out the duty control signal to the solenoid valve 12. The control unit 13 receives detection signals from an engine rotation speed sensor 14 which detects the rotational speed of the engine E, from a pulse generator 15 which detects the rotational speed of a transfer driven gear 19 (which is equal to that of the output shaft of the automatic transmission 2 and corresponds to the speed of a vehicle), from a pulse generator 16 which detects the rotational speed of a kick-down drum 2b coupled to the front sun gear of the automatic transmission 2, from a throttle position sensor 17 which detects the degree of opening of a throttle valve, and from a water temperature sensor 18 which detects the temperature of the water coolant for the engine.

In which gear ratio the automatic transmission 2 is currently positioned can be found out from both the rotational speed of the kick-down drum 2b, which is detected by the pulse generator 16, and that of the output shaft of the automatic transmission 2, which is detected by the pulse generator 15. The rotational speed of the input shaft 2a of the automatic transmission 2 can be detected from the found-out gear ratio and the rotational speed of the output shaft of the transmission 2.

Figure 2:
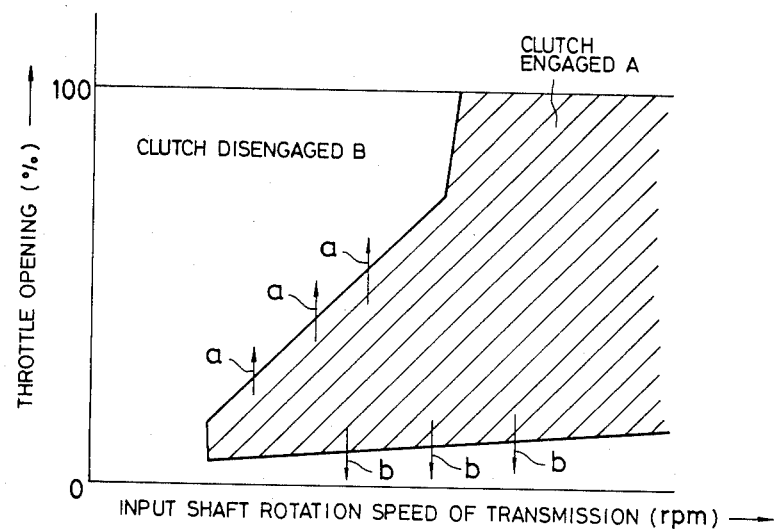
FIGS. 2, 3(a), 3(b), 3(c) and 3(d) shows graphs for explaining operation.
Figure 5:
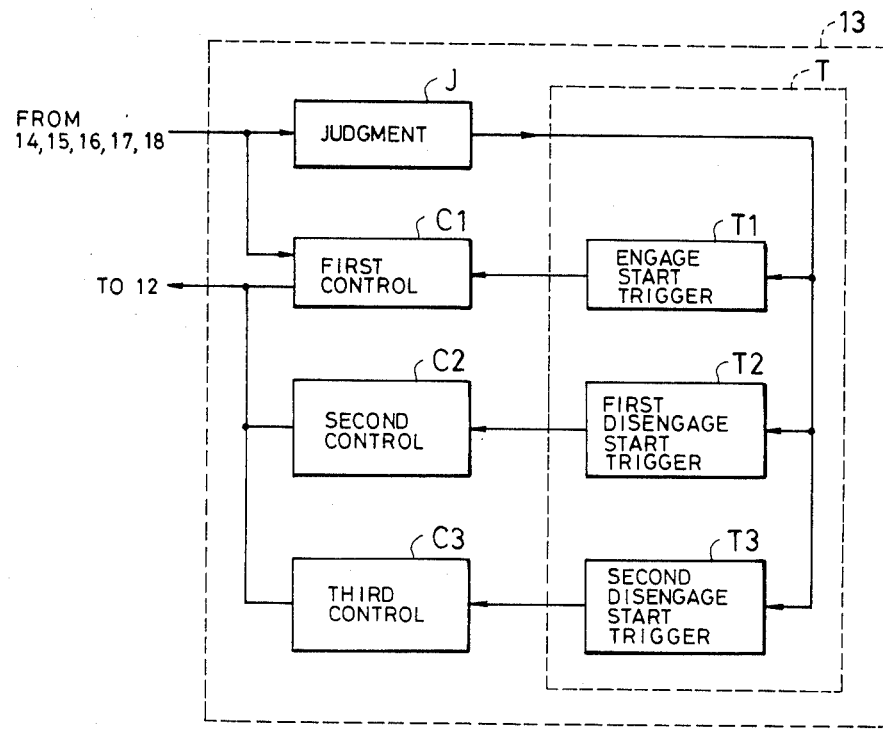
FIG. 5 is a schematic diagram of the control section.

In the automatic transmission 2, the clutch 4 in the torque converter 3 is being engaged, in order to enhance the fuel efficiency of the vehicle, when the speed of the vehicle is higher than a predetermined level. A clutch engagement domain A and a clutch disengagement domain B are set as shown in FIG. 2. In the clutch engagement domain A, control is performed to cause a slight slip to absorb the irregularity in the rotation (the fluctuation of the output torque) of the engine E. For that purpose, as shown in FIG. 5, the control unit 13 comprises a judgment means J for judging whether the operating condition of the vehicle is in the clutch engagement domain A or in the clutch disengagement domain B by using said detected rotational speed of the input shaft 2a and the opening degree of the throttle valve, a trigger means T for instructing the time of start of engagement or disengagement of the clutch 4 depending on a judgment signal from the judgment means J, and a first control means C1 which receives signals from an engagement starting trigger means T1 (described below) and the sensors 14, 15, 16, 17 and 18. The control unit 13 then supplies the solenoid valve 12 with such a first control signal as to cause an appropriate slip in the clutch engagement domain A.

The trigger means T includes the engagement starting trigger means T1 which commands the time when to start engaging the clutch 4 and a first disengagement starting trigger means T2 which commands the time when to disengage the clutch 4 in a case (refer to an arrow a in FIG. 2) in which the clutch 4 is to be disengaged while the torque of the engine is positive and larger than a predetermined value as in the acceleration of the engine. The trigger means T also includes a second disengagement starting trigger means T3 which instructs the time when to start disengaging the clutch in a case (refer to an arrow b in FIG. 2) in which the clutch is to be disengaged while the torque of the engine is zero or negative value as in the deceleration of the engine.

The control unit 13 further comprises a second control means C2 which supplies the solenoid valve 12 with a second control signal to gradually decrease the engaging force of the clutch 4 when the second control means C2 has received a command signal from the first disengagement starting trigger means T2, and a third control means C3 which supplies the solenoid valve 12 with a third control signal to sharply decrease the engaging force of the clutch when the third control means C3 has received a command signal from the second disengagement starting trigger means T3.

Figure 3A:
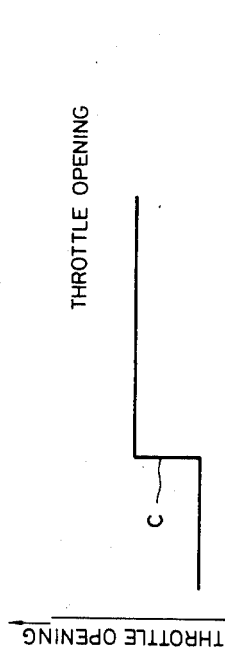
Figure 3B:
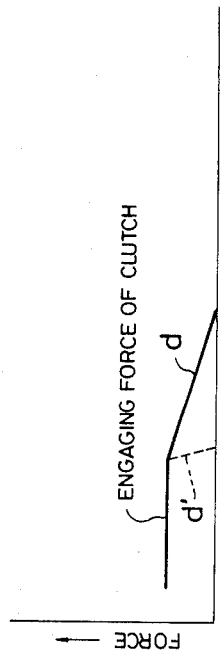
Figure 3C:
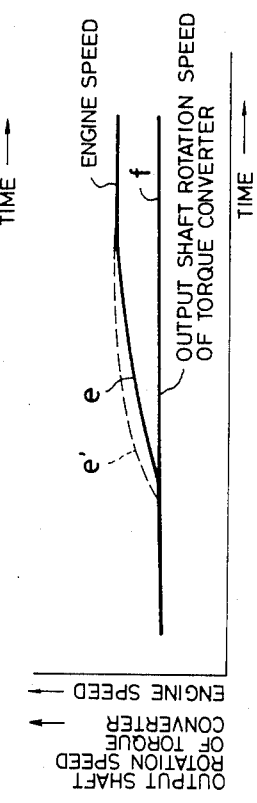
Figure 3D:
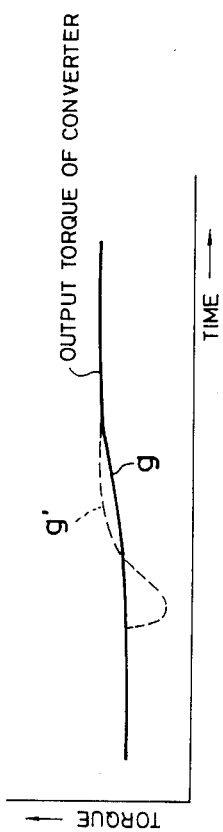
Figure 4:
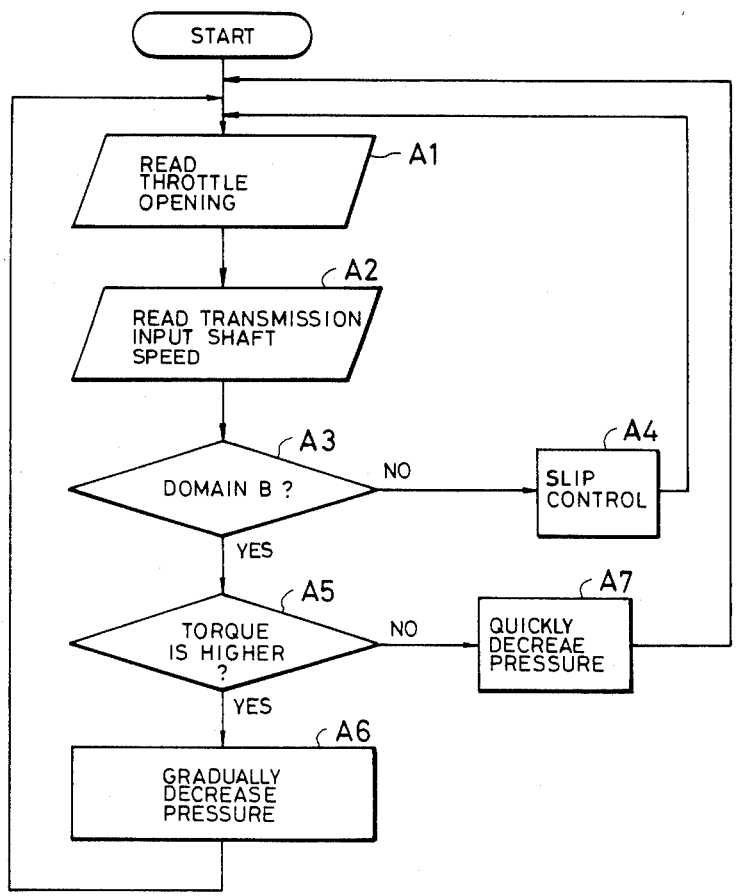
FIG. 4 shows a flow chart for explaining the operation.

When the clutch 4 is to be controlled by the device of the above-described design, the degree of opening of the throttle valave and the rotational speed of the input shaft of the automatic transmission 2 are first read in steps A1 and A2 as shown in FIG. 4. In step A3, it is judged on the basis of the read information whether the operating condition of the vehicle is in the clutch disengagement domain B or not. If it is judged in the step A3 that the operating condition is not in the domain B, the slip control of the clutch 4 is performed in step A4. The slip control is performed chiefly by the first control means C1 of the control unit 13. If it is judged in the step A3 that the operating condition is in the domain B, it is then judged in step A5 whether the torque of the engine is above predetermined value or not (whether the degree of opening of the throttle valve is larger than predetermined degree or not). When the engine is accelerated (which means an alteration in a direction shown by the arrow a in FIG. 2) by increasing the degree of opening of the throttle valve as shown by a symbol c in FIG. 3(a), the "YES" path is taken in the step A5 so that the gradual decrease in the oil pressure on the clutch 4 is performed in a following step A6 (refer to a full-line graph d in FIG. 3(b)). Such control is performed chiefly by the second control means C2 of the control unit 13. As a result, the rotational speed of the engine E is smoothly increased as shown by a symbol e in FIG. 3(c). At that time, the rotational speed of the output shaft of the torque converter 3, which is equal to that of the input shaft 2a of the transmission 2, is nearly constant (refer to a graph f in FIG. 3(c)), and the output torque of the torque converter 3 is also smoothly increased as shown by a full-line graph g. In other words, the transmission of the torque through the clutch 4 is gradually replaced by the transmission of the torque through the torque converter 3. For this reason, the output torque of the transmission 2 is prevented from greatly dropping (refer to a graph g' shown in FIG. 3(d)), as occurs in a conventional transmission at the time of such acceleration of the engine as described above. Consequently, the acceleration performance of the vehicle, such as its response to the acceleration, is much improved.

In a conventional transmission, the engaging force of a clutch is sharply decreased, as shown by line d' in FIG. 3(b), when the clutch is disengaged at the time of acceleration or the like of an engine, as mentioned above. For this reason, the output torque of the transmission greatly drops as shown by the line g' in FIG. 3(d). At that time, the rotational speed of the engine sharply rises as shown by a line e' in FIG. 3(c), namely, the engine races somewhat too fast.

The "NO" path is taken in the step A5, when the engine is decelerated (which means the return of an accelerator pedal toward a throttle closure position) or other occurrences of torque reduction so as to cause an alteration in a direction shown by the arrow b in FIG. 2. In this case, the oil pressure on the clutch 4 is sharply decreased in a step A7. Such control is effected chiefly by the third control means C3 of the control unit 13. In this case, the clutch 4 is quidkly disengaged. For this reason, a deceleration shock at the time of the sharp return of the accelerator pedal to the throttle closure position and a resultant stall of the engine at the time of sharp braking immediately after the return of the accelerator pedal to the throttle closure position can be completely prevented.

The apparatus provided according to the present invention can be applied not only to such a slip clutch as described above, but also to a lockup clutch almost in the same manner as to the slip clutch.

The apparatus provided according to the present invention controls a clutch of the variable engaging force type, which is disposed in parallel with a hydrodynamic power transmitting device interposed between the output shaft of an engine and the input shaft of a transmission and through which the output torque of the engine can be transmitted to the input shaft of the transmission and by-passing the hydrodynamic power transmitting device. The apparatus has such a simple construction that it only comprises commanding means which commands the time when to start disengaging the clutch according to the operating of the engine to gradually decrease the engaging force of the clutch in disengaging the clutch while the change in the torque of the engine is positive, and control means which receives a command signal from the commanding means to perform control to decrease the engaging force of the clutch. As a result, the output torque of the transmission is prevented from greatly dropping when the clutch is disengaged during the acceleration of the engine. Such acceleration performance improves acceleration response the vehicle.

I claim:

1. An apparatus for controlling a variable-capacity clutch in a hydrodynamic power transmitting system comprising: a hydrodynamic power transmitting device interposed between an output shaft on an engine and an input shaft of a transmission; and a clutch transmitting power in parallel with said hydrodynamic power transmitting device from said output shaft to said input shaft, said controlling apparatus comprising;

an operating condition detection means for detecting operating conditions of said engine including its torque;

judgment means which receives a signal from said operating condition detection means for judging whether the operating condition of the engine is in a domain in which the clutch should be disengaged;

trigger means which receives a signal from said judgment means for commanding the disengagement of said clutch; and first control means which receives a disengagement command signal from said trigger means and receives a signal indicating that the torque of said engine is higher than a first predetermined level from said operating condition detection means, for gradually decreasing the torque transmission capacity of said clutch upon disengaging said clutch 2. An apparatus according to claim 1, wherein said operating condition detection means comprises at least a torque detection means for detecting the torque of the engine, and rotation speed detection means for detecting a rotational speed of the input shaft of the transmission; and wherein the judgment means receives signals from said torque detection means and said rotation speed detection means so as to generate a disengagement domain signal depending on the torque of the engine and the rotational speed of the input shaft, and wherein the trigger means receives the disengagement domain signal from said judgment means so as to generate the disengagement signal.

3. An apparatus according to the claim 1, further comprising second control means for sharply decreasing the torque capacity of the clutch to disengage said clutch when said means receives said disengagement command signal from the trigger means and receives from said operating condition detection means a signal indicating that the torque of the engine is lower than a second predetermined level lower than said first predetermined level.

4. An apparatus according to the claim 1, wherein the engine having an intake passage is an internal combustion engine; and wherein the torque detection means in the operating condition detection means is an opening degree detection device for detecting the degree of opening of a throttle valve provided in the intake passage of said internal combustion engine.

* * * * *